United States Patent [19]

Beichler

[11] Patent Number: 5,781,006
[45] Date of Patent: Jul. 14, 1998

[54] MAGNETIC SENSOR FOR INDENTIFYING THE POSITION OF A TEST SUBJECT

[75] Inventor: Johannes Beichler, Rodgau, Germany

[73] Assignee: Siemens Aktiengesellschaft, Munich, Germany

[21] Appl. No.: 499,893

[22] Filed: Jul. 11, 1995

[30] Foreign Application Priority Data

Jul. 21, 1994 [DE] Germany .................. 44 25 904.2

[51] Int. Cl.$^6$ .............. G01B 7/14; G01B 5/20; H01F 1/153
[52] U.S. Cl. .............. 324/207.19; 324/207.24
[58] Field of Search .............. 324/207.11, 207.16, 324/207.17, 207.18, 207.19, 207.24, 225, 207.22, 207.12; 336/233, 234

[56] References Cited

U.S. PATENT DOCUMENTS

| | | | |
|---|---|---|---|
| 2,989,711 | 6/1961 | Smith | 324/207.18 |
| 4,074,185 | 2/1978 | Dardenne | 324/207.16 |
| 4,774,465 | 9/1988 | Nilius . | |
| 4,866,378 | 9/1989 | Redlich | 324/225 |
| 5,204,621 | 4/1993 | Hermann et al. | 324/207.22 |

FOREIGN PATENT DOCUMENTS

OS 2006996  8/1971  Germany .

Primary Examiner—Walter E. Snow
Attorney, Agent, or Firm—Hill & Simpson

[57] ABSTRACT

A magnetic distance sensor for acquiring the position of a test subject has an elongated magnetic core that contains crystalline strips and amorphous strips. A measuring winding supplied by a constant current source generates respective voltages, directed oppositely relative to one another, in two coils, so that a differential voltage arises dependent on the position of the test subject. A distance sensor that is insensitive to unwanted magnetic fields is thus obtained.

4 Claims, 1 Drawing Sheet

MAGNETIC SENSOR FOR INDENTIFYING THE POSITION OF A TEST SUBJECT

BACKGROUND OF THE INVENTION

1. Field of the Invention

The present invention is directed to a magnetic distance sensor for acquiring the position of a test subject.

2. Description of the Prior Art

European Application 238 922, corresponding to United States Patent No. 4,744,465 discloses a distance sensor which is movable in non-contacting fashion along a soft-magnetic magnetic core in the form of an elongated strip, the core having a measuring winding that extends over the entire distance to be measured. The test subject saturates the magnetic core at that location adjacent to the test subject and thus generates a virtual air gap. Two further coils connected in series with one another are arranged at the ends of the magnetic core. The coils arranged in series with one another are connected such that they respectively oppositely magnetize the magnetic core, whereas the elongated measuring winding is connected to an evaluation circuit for acquiring the induced voltage difference.

Given identical spacings of the turns of the measuring winding from one another, this known distance sensor supplies an output voltage that varies linearly relative to the position of the test subject and is basically extremely well-suited for the exact acquisition of the position of a test subject. This known distance sensor, however, has the disadvantage that its output signal, which is composed of the differential voltage of the voltages induced in the elongated secondary winding, is falsified if a constant magnetic field or a low-frequency magnetic field acts on the magnetic core in the longitudinal direction, since the position of the virtual air gap is influenced by a constant field and an alternating field influences the differential voltage induced in the measuring winding.

An amorphous or nanocrystalline soft-magnetic strip can be employed as the core material in this known distance sensor, this having significantly better soft-magnetic properties (lower coercive force, lower remagnetization losses) compared to normal crystalline material. Due to the technique for manufacturing amorphous strips, i.e., by rapid quenching from the molten condition, a strip having only a slight thickness of approximately 20 through 40 µm can be manufactured of amorphous or nanocrystalline material, so that an extremely thin magnetic cross-section arises. This suffices for guiding the induced alternating field but causes a rapid saturation due to the influence of magnetic noise fields.

German OS 20 06 996 discloses a distance sensor having an a.c.-permeated, elongated primary winding and two oppositely connected secondary windings. In this known device, a primary winding is located between two secondary windings on a magnetic core that forms a self-contained circuit. A short-circuit ring that causes a stray flux serves, for example, for generating a virtual air gap. Depending on the location along the primary winding at which the short-circuit ring is located, more or fewer turns of the primary winding generate a voltage for feeding the secondary windings that are situated at both sides of the primary winding. The differential voltage that is formed in the secondary windings and arises due to opposite series connection is thus dependent on the position of the short-circuit ring and, thus, of the test subject whose distance is to be identified.

Such an arrangement is relatively insensitive to magnetic noise fields since these act oppositely in the legs of the closed magnetic core that are parallel to one another and the signal contributions arising therefrom thus substantially cancel each other.

This known sensor, however, requires a closed magnetic circuit and requires a magnetic shunt that divides this circuit into two sub-circuits. It is thus relatively expensive to manufacture compared to other magnetic distance sensors and requires a large structural volume since the magnetic core requires two elongated legs that are connected to one another. Moreover, the inductance of the primary winding changes dependent on the position of the shunt, and thus on the position of the test subject, since the inductance of a winding is dependent on the square of the number of turns. One thus obtains an output signal that is dependent not only on the design of the primary winding but also is dependent on the position of the test subject. A linear relationship with the position of the test subject is thus difficult to realize.

SUMMARY OF THE INVENTION

An object of the present invention is to provide a magnetic distance sensor which is an improvement over the initially cited distance sensor provided with a strip-shaped magnetic core, which is economically manufacturable compared to the distance sensor with a closed magnetic circuit, and which is less sensitive to unwanted magnetic fields while retaining the possibility of realizing a linear dependency of the output signal on the position of the test subject under test in a simple way.

The above object is inventively achieved in a magnetic position sensor having an elongated magnetic core with coils followed by an evaluation circuit for acquiring the induced differential voltage, having measuring winding connected to a constant current source that generates an alternating current with constant amplitude independently of the inductive impedance of the measuring winding.

DESCRIPTION OF THE PREFERRED EMBODIMENTS

Figure 1:
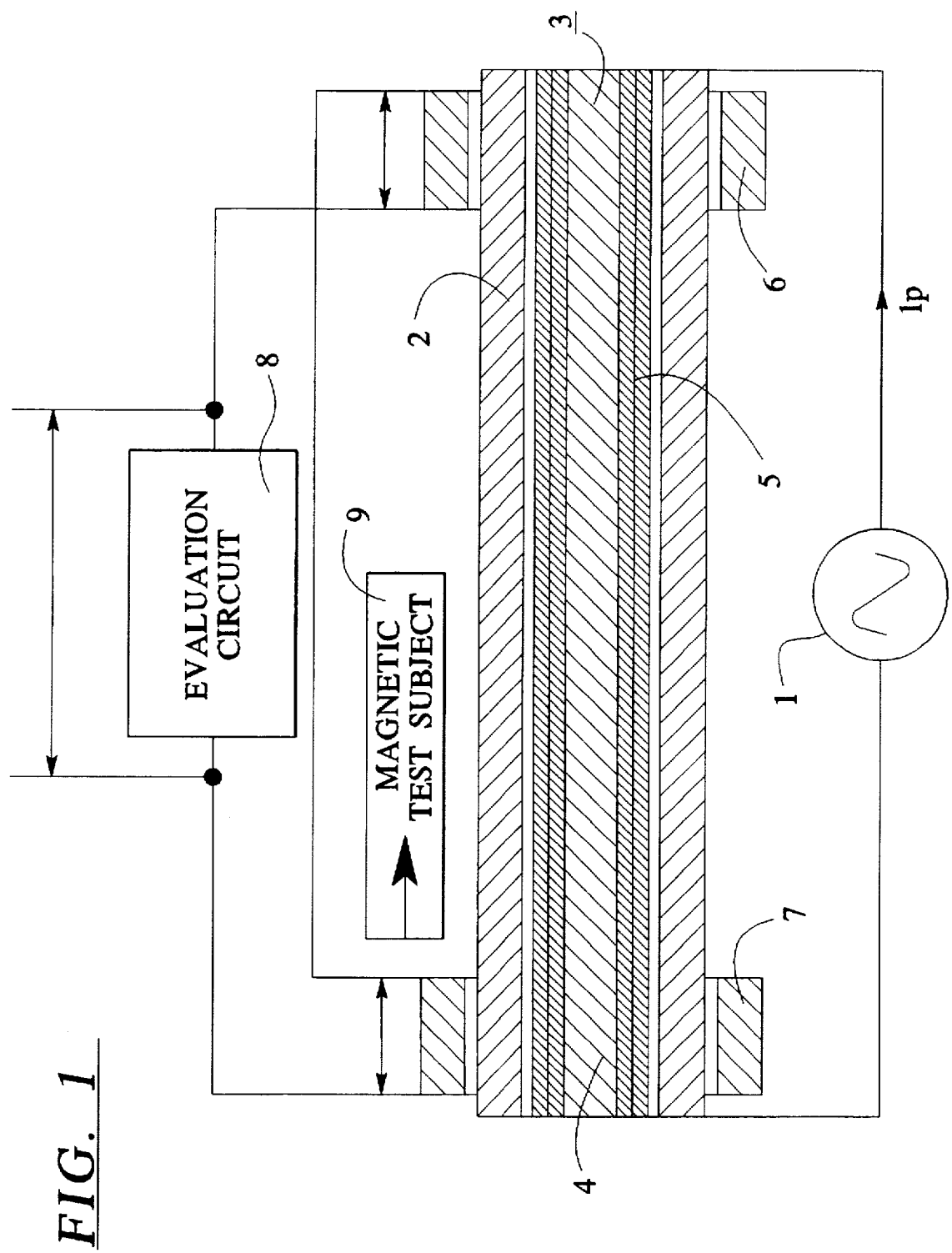
FIG. 1 is a schematic illustration of a magnetic position sensor, constructed and operating in accordance with the principles of the present invention.

An exemplary embodiment is shown in the drawing. An elongated measuring winding 2, which surrounds a magnetic core 3, is connected to a constant current source 1 that emits an alternating current with constant amplitude. Independently of the inductance of the measuring winding 2, which inductance varies dependent on the position of the test subject 9, the constant current source 1 supplies a constant current Ip, so that the voltages induced in the coils 6 and 7 are only dependent on the number of turns of the measuring winding 2 at both sides of the virtual air gap produced by the test subject 9.

The magnetic core 3 is composed of an elongated strip 4 of soft-magnetic, crystalline material as well as a number of strips 5 of soft-magnetic, amorphous material that are arranged at both sides of the strip 4 of crystalline material. The coils 6 and 7 are located spaced from one another at the ends of the magnetic core 3, these being seriesconnected such that the voltages induced by a flux in the magnetic core 3 are directed oppositely one another. An evaluation circuit 8 that evaluates a measured value in a known way for the position of the test subject 9 that, for example, is a permanent magnet, is connected to the coils 6 and 7.

The improved insensitivity to unwanted magnetic fields compared to the arrangement of European Application 238 922 is achieved because the low-frequency alternating fields that permeate the magnetic core 3—by contrast to the known arrangement—likewise induce voltages in the coils 6 and 7 that mutually cancel, since the magnetic field permeating the magnetic core 3 is of the same size in the region of the coil 6 as well as in the region of the coil 7, regardless of the position of the test subject 9.

Independently of the position of the test subject 9 and independently of the differing inductance caused as a result thereof in the measuring winding 2 divided into two parts by the virtual air gap, the impressed current in the measuring winding 2 assures that a current having constant amplitude always flows through each turn (winding). This achieves given identical spacings between each two neighboring turns, a linear dependency of the output voltage at the series circuit of the coils 6 and 7 on the position of the test subject 9. Moreover, other, defined dependencies can be set with a differing turn spacing.

The soft-magnetic, crystalline magnetic core 3, which can have a larger crosssection as well as a higher permeability compared to the strips 4 and 5, serves the purpose of improving the insensitivity to disruption due to the influence of constant fields without a large number of strips having to be layered on top of one another. Relatively strong constant fields therefore do not lead to the saturation of the magnetic core 3, and thus to the shift of the virtual air gap produced by the test subject.

The inventive arrangement thus creates a measuring arrangement that is independent of unwanted magnetic fields, that is very simply constructed, and that can be kept relatively small in size since a closed magnetic circuit is not required. The structure becomes especially simple when the crystalline strip 4 and the amorphous strip 5 are not glued to one another but instead are held together by the turns of the measuring winding 2. The arrangement is especially economic to manufacture in this way. It is also possible, however, to glue the strips 4 and 5 to one another or to connect them in some other way. The strips 5 can alternatively be composed of nanocrystalline material that can be produced by crystallization of amorphous strips.

Although modifications and changes may be suggested by those skilled in the art, it is the intention of the inventor to embody within the patent warranted hereon all changes and modifications as reasonably and properly come within the scope of his contribution to the art.

I claim as my invention:

1. A magnetic distance sensor for identifying the position of a test subject, comprising:

an elongated soft-magnetic core having a length which includes a distance to be measured, said magnetic core being composed of an elongated strip of soft-magnetic crystalline material and at least one strip of amorphous material;

a measuring winding, having an inductive impedance, wound around said magnetic core completely along said distance to be measured;

a magnetic test subject movable along said magnetic core over said measuring winding and spaced from said magnetic core and said measuring winding, said test subject saturating said magnetic core at a location adjacent to said test subject and thereby generating a virtual air gap at that location;

first and second coils connected in series and respectively disposed at opposite ends of said magnetic core;

evaluation means connected to said first and second coils for measuring an inducted differential voltage between said first and second coils; and constant current source means connected to said measuring winding for generating an alternating current of constant amplitude independently of the inductive impedance of the measuring winding and independently of a position of said test subject along said magnetic core for producing a linear relationship between said differential voltage and said position of said test subject over an entirety of said distance.

2. A magnetic distance sensor as claimed in claim 1 wherein said elongated strip of soft-magnetic material and said strip of amorphous material are held together by the measuring winding wound around said soft-magnetic core.

3. A magnetic distance sensor for identifying the position of a test subject, comprising:

an elongated soft-magnetic core having a length which includes a distance to be measured, said magnetic core being composed of an elongated strip of soft-magnetic crystalline material and at least one strip of nanocrystalline material;

a measuring winding, having an inductive impedance, wound around said magnetic core completely along said distance to be measured;

a magnetic test subject movable along said magnetic core over said measuring winding and spaced from said magnetic core and said measuring winding, said test subject saturating said magnetic core at a location adjacent to said test subject and thereby generating a virtual air gap at that location;

first and second coils connected in series and respectively disposed at opposite ends of said magnetic core;

evaluation means connected to said first and second coils for measuring an inducted differential voltage between said first and second coils; and constant current source means connected to said measuring winding for generating an alternating current of constant amplitude independently of the inductive impedance of the measuring winding and independently of a position of said test subject along said magnetic core for producing a linear relationship between said differential voltage and said position of said test subject over an entirety of said distance.

4. A magnetic distance sensor as claimed in claim 3 wherein said elongated strip of soft-magnetic material and said strip of nanocrystalline material are held together by the measuring winding wound around said soft-magnetic core.

* * * * *